United States Patent
Eslaminovin

[11] Patent Number: 5,805,057
[45] Date of Patent: Sep. 8, 1998

[54] REMOTE VEHICLE DISABLING AND DISTRESS INDICATOR SYSTEM

[76] Inventor: Firooz B. Eslaminovin, 711 W. Broadway, Centralia, Ill. 62801

[21] Appl. No.: 965,005

[22] Filed: Nov. 5, 1997

[51] Int. Cl.$^6$ .................................................. B60R 25/10
[52] U.S. Cl. ..................... 340/426; 340/425.5; 307/10.2; 307/10.3; 307/10.4; 307/10.5; 180/287; 180/167; 379/37; 379/39
[58] Field of Search ..................................... 340/426, 428, 340/429, 430, 425.5, 825.69, 825.72, 539; 307/10.2, 10.3, 10.4, 10.5, 10.6; 180/287, 167; 379/37, 38, 39, 44; 455/404

[56] References Cited

U.S. PATENT DOCUMENTS

| | | | |
|---|---|---|---|
| 4,882,570 | 11/1989 | Martinez | 340/574 |
| 5,225,713 | 7/1993 | Henneberry et al. | 307/10.2 |
| 5,276,728 | 1/1994 | Pagliaroli et al. | 455/404 |
| 5,486,806 | 1/1996 | Firari et al. | 340/426 |
| 5,506,562 | 4/1996 | Wiesner | 340/425.5 |
| 5,534,845 | 7/1996 | Issa et al. | 340/425.5 |
| 5,600,299 | 2/1997 | Tompkins | 340/429 |
| 5,623,245 | 4/1997 | Gilmore | 340/426 |
| 5,638,044 | 6/1997 | Chua | 340/426 |
| 5,652,564 | 7/1997 | Winbush | 340/426 |
| 5,673,017 | 9/1997 | Dery et al. | 340/426 |
| 5,729,192 | 3/1998 | Badger | 340/426 |

FOREIGN PATENT DOCUMENTS

| | | |
|---|---|---|
| 2457525 | 1/1981 | France . |
| 4-146853 | 5/1992 | Japan . |

*Primary Examiner*—Nina Tong
*Attorney, Agent, or Firm*—Richard C. Litman

[57] ABSTRACT

A remote vehicle disabling and distress indicator system for a motor vehicle that is activated by an external telephone call or internally by one of two switches. The telephone call sends a signal received by a modular telephone stored in the vehicle that disables the vehicle by deactivating the ignition coil or substantially closing a fuel valve that controls fuel flow between the vehicle fuel tank and the vehicle engine. The signal also causes a distress sign at the top of the vehicle to be illuminated. In addition, the signal activates a tape machine that plays a prerecorded distress tape message through speakers that send a loud audible reproduction of the taped message internally and externally to the motor vehicle to attract the attention of any local population. The taped message may be any of a variety of messages, such as "HELP!", "CALL THE POLICE!", etc.

7 Claims, 3 Drawing Sheets

REMOTE VEHICLE DISABLING AND DISTRESS INDICATOR SYSTEM

BACKGROUND OF THE INVENTION

1. Field of the Invention

The present invention relates in general to security systems and, more particularly, to an apparatus and method for preventing theft or unauthorized use of a motor vehicle.

2. Description of Related Art

In recent years the theft of motor vehicles has assumed unprecedented proportions. Hundreds of vehicles are stolen or used illegally every day, costing insurance companies and vehicle owners millions of dollars every year. Devices which prevent such thefts and illegal uses are in great demand from insurance companies and local, state and federal law enforcement agencies as well as vehicle owners. To date, few devices have successfully prevented such thefts and illegal uses. Those which have been successful are found to be generally too expensive or complicated to implement, too time-consuming to operate effectively, or have other major limitations which prevent them from becoming popular and usable everywhere. The related art is represented by the following patents of interest.

U.S. Pat. No. 4,882,570, issued on Nov. 21, 1989 to Antonio Martinez, describes a vehicle distress indicator. Martinez does not suggest the remote vehicle disabling and distress indicator system according to the claimed invention.

U.S. Pat. No. 5,225,713, issued on Jul. 6, 1993 to Warren J. Henneberry et al., describes a mobile security system. Henneberry et al. do not suggest the remote vehicle disabling and distress indicator system according to the claimed invention.

U.S. Pat. No. 5,276,728, issued on Jan. 4, 1994 to Kenneth Pagliaroli et al., describes a system for remotely disabling or enabling a motor vehicle having at least one receiver which scans signal codes transmitted in frequencies dedicated to mobile telephone communications, and at least one frequency outside that used in mobile telephone communications. Pagliaroli et al. do not suggest the remote vehicle disabling and distress indicator system according to the claimed invention.

U.S. Pat. No. 5,486,806, issued on Jan. 23, 1996 to Harold A. Firari et al., describes an anti-hijacking and theft prevention device for motor vehicles. Firari et al. do not suggest the remote vehicle disabling and distress indicator system according to the claimed invention.

U.S. Pat. No. 5,506,562, issued on Apr. 9, 1996 to Jerry C. Wiesner, describes a system for remotely shutting off an engine and sounding off an alarm. Wiesner does not suggest the remote vehicle disabling and distress indicator system according to the claimed invention.

U.S. Pat. No. 5,534,845, issued on Jul. 9, 1996 to Darrell E. Issa et al., describes an electrically powered security system for monitoring and controlling access to a protected area and having multiple levels of alert signals commensurate with the level of security threat to the area. Issa et al. do not suggest the remote vehicle disabling and distress indicator system according to the claimed invention.

U.S. Pat. No. 5,600,299, issued on Feb. 4, 1997 to Eugene Tompkins, describes a beeper controlled auto security system. Tompkins does not suggest the remote vehicle disabling and distress indicator system according to the claimed invention.

U.S. Pat. No. 5,623,245, issued on Apr. 22, 1997 to Jack R. Gilmore, describes an anti-theft and anti-carjacking system for a motor vehicle. Gilmore does not suggest the remote vehicle disabling and distress indicator system according to the claimed invention.

U.S. Pat. No. 5,638,044, issued on Jun. 10, 1997 to Jaime S. Chua, describes an apparatus and method for preventing car-jacking. Chua does not suggest the remote vehicle disabling and distress indicator system according to the claimed invention.

U.S. Pat. No. 5,652,564, issued on Jul. 29, 1997 to Solomon L. Winbush, describes a security system that allows a user to remotely disable a vehicle that has been carjacked. Winbush does not suggest the remote vehicle disabling and distress indicator system according to the claimed invention.

France Patent document number 2,457,525, published on Jan. 23, 1981, describes a vehicle distress indicator. France '525 does not suggest the remote vehicle disabling and distress indicator system according to the claimed invention.

Japan Patent document number 4-146853, published on May 20, 1992, describes an apparatus and method for preventing car-jacking.

Japan '853 does not suggest the remote vehicle disabling and distress indicator system according to the claimed invention.

None of the above inventions and patents, taken either singly or in combination, is seen to describe the instant invention as claimed.

SUMMARY OF THE INVENTION

The present invention is a remote vehicle disabling and distress indicator system activated by a telephone call or internally by one of two switches. A telephone call to a phone number associated with the remote vehicle disabling and distress indicator system installed in a vehicle sends a signal that disables the vehicle by deactivating the ignition coil or shutting down the fuel line and illuminating a distress message at the top of the vehicle. In addition the signal activates a loud prerecorded tape via speakers that send the loud audible taped message external to the motor vehicle to attract the attention of any local population. The taped message may be any of a variety of messages, such as "HELP!", "CALL THE POLICE!", etc.

Accordingly, it is a principal object of the invention to provide a remote vehicle disabling and distress indicator system which deactivates the ignition coil or closes the fuel line and illuminates a distress message at the top of the vehicle.

It is an object of the invention to provide improved elements and arrangements thereof in a remote vehicle disabling and distress indicator system for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

In accordance with this invention it has been found that a simple, inexpensive and easily installed remote vehicle disabling and distress indicator system can be provided for motor vehicles that enables vehicle operators to disable a vehicle remotely via a telephone call or internally via hidden switches, and that activates a large audible tape recorded distress message externally to the vehicle to attract attention of any local population. A distress message is also illuminated from the top of the vehicle.

Figure 1:
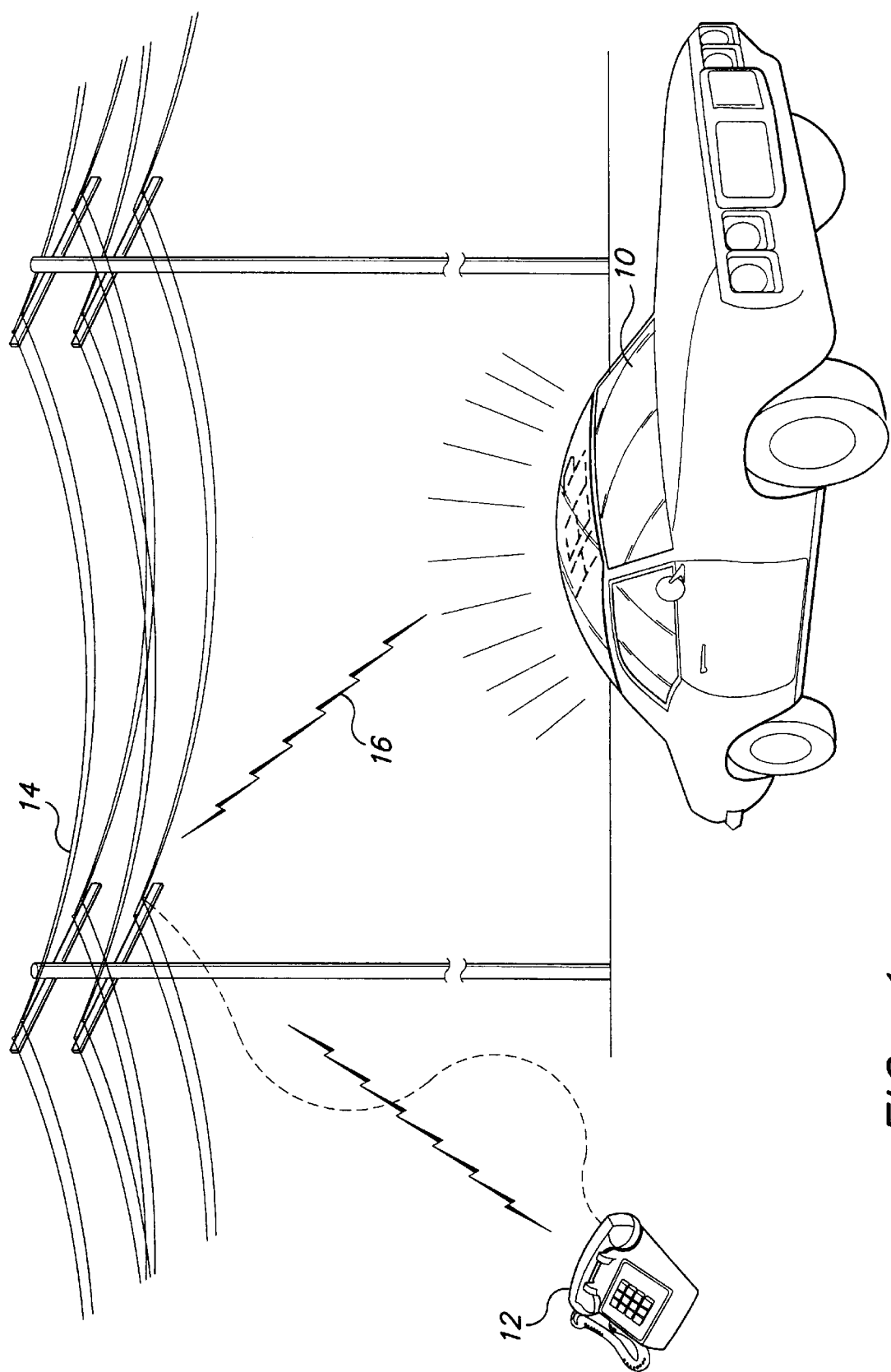
FIG. 1 is perspective view of an embodiment of a remote vehicle disabling and distress indicator system according to the invention.

The present invention, the new and improved remote vehicle disabling and distress indicator system, is shown generally in FIG. 1 as installed on a motor vehicle and activated remotely. The remote vehicle disabling and distress indicator system may be installed on any motor driven vehicle such as an automobile, truck, construction equipment, boat or the like. Vehicles of these types have an electrical system, certain components of which normally include an ignition coil, which is connected to an ignition switch which is normally a key operated switch. Most automotive systems operate at twelve volts with the negative side grounded. The following is a brief description of the typical electrical system for a vehicle.

The alternator or generator in automotive electric systems is driven by the engine through a belt drive and when in operation is connected to the battery. Automotive systems include a voltage regulator and a coil is connected across the terminals of the battery when a circuit breaker is closed. Initially, when the vehicle is first started, the ignition key is turned and the battery is connected to the starter motor across a starter relay and solenoid starting a switch. Once the engine begins to run, the starter motor is disconnected from operation. When the starting relay is closed, the circuit to the solenoid or the starting switch is closed. The pinion on the motor shaft engages with the gear teeth of the flywheel cranking the engine until it starts.

As shown in FIG. 1, a motor vehicle 10 possessing a remote vehicle disabling and distress indicator system according to the invention is activated by a telephone call through an external telephone 12 over a telephone line 14 via a signal 16. The telephone may also be a modular telephone which sends signals through satellites. The signal 16 makes contact with a modular telephone carried in the vehicle and disables the vehicle 10 by deactivating the ignition coil or substantially closing a fuel valve that controls fuel flow between the vehicle fuel tank and the vehicle engine. The signal 16 also illuminates a distress sign at the top of the vehicle 10. In addition the signal 16 activates a tape machine in the vehicle that plays a prerecorded distress tape message and sends a loud audible output of the taped distress message through speakers internally and externally of the motor vehicle to attract the attention of any local population. The taped message may be any of a variety of messages, such as "HELP!", "CALL THE POLICE!", etc. Deactivation of the ignition coil or substantial closure of the fuel valve, illumination of the distress message at the top of the vehicle, and activation of the tape machine that plays the prerecorded distress tape message is achieved with the use of a bar magnet that causes switches to activate and deactivate the ignition coil or substantially close the fuel valve, illuminate the distress message and activate the tape machine to play the prerecorded distress tape.

The remote vehicle disabling and distress indicator system includes an electronic control device installed within the vehicle. The electronic control device is electrically connected through switches to the vehicle ignition switch or the fuel valve, the distress sign installed in the top of the vehicle, the tape machine used to play the prerecorded distress tape message, and speakers installed in the vehicle to transmit audio sounds internally and externally of the vehicle. The switches on the electronic control device are activated by the use of a bar magnet which causes the switches to be raised after receiving a signal from either a modular telephone stored in the vehicle that has received a call from an external telephone or from activation of two other switches electrically connected to the switches on the electronic control device that are positioned as desired by the vehicle operator within reachable access to the operator's hands. The two switches are used by the vehicle operator to disable the vehicle and/or illuminate the distress sign and activate the tape machine to play the taped distress message through speakers that send audible sound internally and externally of the vehicle.

Figure 2:
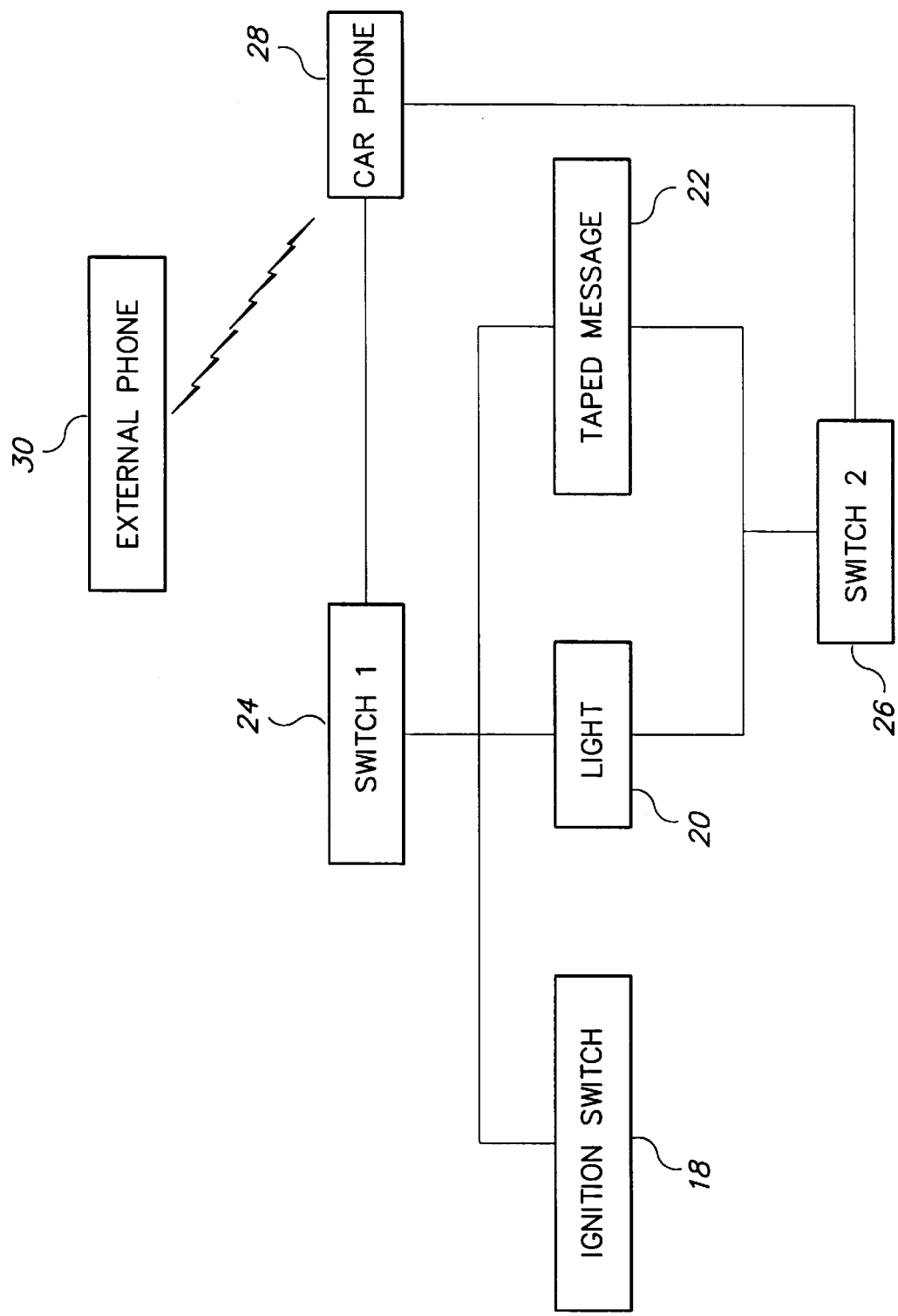
FIG. 2 is a block diagram of an embodiment of a remote vehicle disabling and distress indicator system according to the invention.

A block diagram of one embodiment of the invention is shown in FIG. 2. The vehicle disabling and distress indicator system can be activated remotely by a external telephone 30 or internally by the use of one of two switches 24 and 26. The external telephone 30 transfers signals to a modular car telephone 28 stored in the vehicle that sends a signal to a bar magnet which activates switches 24 and 26. The switches 24 and 26 disable the vehicle by deactivating the ignition switch 18 and illuminating a distress sign 20 at the top of the vehicle. In addition the switches 24 and 26 activate a tape machine in the vehicle that plays a prerecorded distress tape message 22 and sends the loud audible taped message through speakers connected internally and externally to the motor vehicle to attract the attention of any local population. The taped message may be any of a variety of messages, such as "HELP!", "CALL THE POLICE!", etc.

The vehicle owner may actually be driving the vehicle when an incident occurs that causes distress for the operator, such as a heart attack, carjacking, or someone aggressively following the vehicle. In the case of an incident such as a heart attack, the operator may be not be able to safely stop the vehicle and may wish to disable the vehicle in which case one would merely need to depress a hidden switch near the operator's hand which is electrically connected to switch 24 and causes the ignition switch to deactivate, the distress signal 20 to illuminate, and the tape machine to activate to playback the prerecorded distress message 22 on speakers internally and externally of the vehicle. In a case such as a closely following aggressive driver, an operator may wish only to activate the elements that do not disable the vehicle. In such a case, one would need merely to depress a hidden switch electrically connected to switch 26 which would illuminate the distress sign 20 mounted on the top of the vehicle roof, and would activate the tape machine to playback the prerecorded distress message 22 on the speakers internally and externally of the vehicle.

Figure 3:
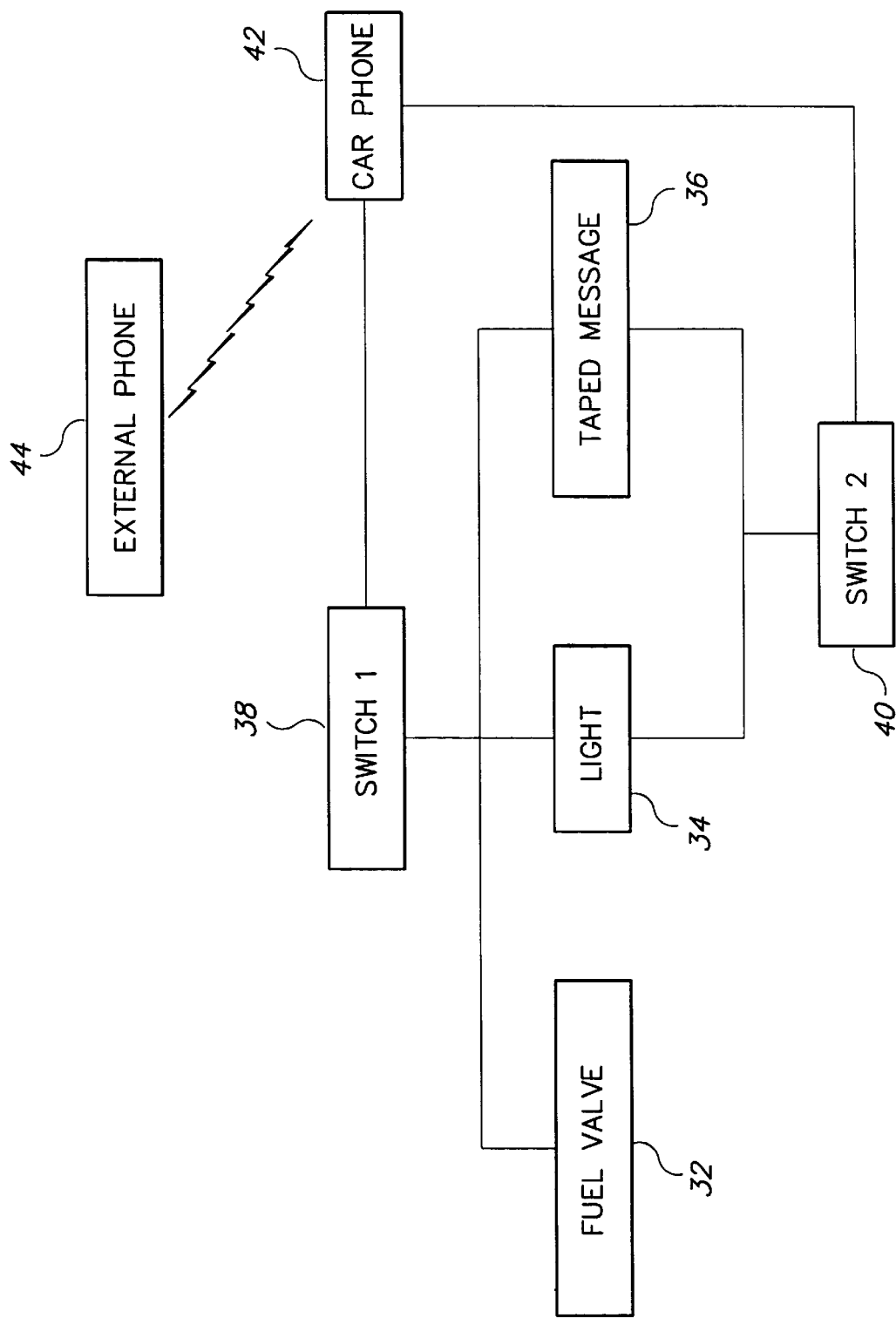
FIG. 3 is a block diagram of an embodiment of a remote vehicle disabling and distress indicator system according to the invention.

A block diagram of the another embodiment of the invention is shown in FIG. 3. The vehicle disabling and distress indicator system can be activated remotely by an external telephone 44 or internally by the use of one of two switches 38 and 40. As mentioned above, the external telephone 44 transfer signals to a modular telephone 42 stored in the vehicle that sends a signal to a bar magnet which activates switches 38 and 40. The switch 38 disables the vehicle by causing a fuel valve 32 to be substantially closed so as to allow the vehicle to travel at a rate of only about five to ten miles per hour. The switch 38 also illuminates the distress sign 34 at the top of the vehicle. In addition the switch 38 activates the tape machine stored in the vehicle to playback the prerecorded distress tape message 36 on the speakers that sends the loud audible distress taped message internally and externally to the motor vehicle to attract the attention of any local population. The switch 40 is activated by the vehicle operator when the operator does not wish to disable the vehicle. The switch 40 illuminates the distress sign 34 at the top of the vehicle and activates the tape machine stored in the vehicle to playback the prerecorded distress tape message 36 on the speakers that send the loud audible taped message internally and externally to the motor vehicle to attract the attention of any local population. However, the switch 40 does not disable the vehicle. The taped message may be any of a variety of messages, such as "HELP!", "CALL THE POLICE", etc.

The vehicle owner may actually be driving the vehicle when an incident occurs that causes distress for the operator, such as a heart attack, carjacking, or someone aggressively following the vehicle. In the case of an incident such as a heart attack, the operator may be not be able to safely stop the vehicle and may wish to disable the vehicle in which case one would merely need to depress a hidden internal switch electrically connected to switch 38 to deactivate the ignition switch, to illuminate the distress signal 34, and to activate the tape machine to playback the prerecorded distress message 36 on the speakers. In a case such as a closely following aggressive driver, an operator may wish only to activate the elements that do not disable the vehicle. In such a case, one would need merely to depress a hidden internal switch electrically connected to switch 40 which would illuminate the distress sign mounted on the top of the vehicle roof, and would activate the tape machine to playback the prerecorded distress tape message 36 on the speakers internally and externally of the vehicle.

It is to be understood that the present invention is not limited to the sole embodiment described above, but encompasses any and all embodiments within the scope of the following claims.

I claim:

1. A remote vehicle disabling and distress indicator system for a motor vehicle comprising:

a modular telephone for receiving an external telephone call to activate said disabling and distress indicator system;

electronic control means mounted within the vehicle for disabling the vehicle upon being activated; wherein said electronic control means include a first switch to disable the vehicle, illuminate said distress sign, and activate said tape machine to playback and transmit said prerecorded distress tape message internally and externally of the vehicle, and a second switch to illuminate said distress sign, and activate said tape machine to playback and transmit said prerecorded distress tape message internally and externally of the vehicle;

a distress sign mounted on the vehicle, and capable of being illuminated;

a tape machine mounted within the vehicle for playing back a prerecorded distress tape message; and one or more speakers mounted in the vehicle for transmitting audio sounds of said prerecorded distress tape message internally and externally of the vehicle;

wherein said electronic control means electronically disables the vehicle, illuminates said distress sign, activates said tape machine to playback said prerecorded distress tape message, and activates said one or more speakers to transmit said prerecorded distress tape message internally and externally of the vehicle.

2. The remote vehicle disabling and distress indicator system according to claim 1, further comprising means for activating said system by a signal transmitted from the telephone external to the vehicle.

3. The remote vehicle disabling and distress indicator system according to claim 1, further comprising a first means for disabling the vehicle by deactivating a vehicle ignition switch.

4. The remote vehicle disabling and distress indicator system according to claim 1, further comprising a second means for disabling the vehicle by substantially closing a fuel valve that provides fuel flow between a fuel tank of the vehicle and an engine of the vehicle.

5. The remote vehicle disabling and distress indicator system according to claim 4, wherein said second disabling means is configured to limit the vehicle to a speed within a range of about zero to about ten miles per hour by substantially closing the fuel valve.

6. The remote vehicle disabling and distress indicator system according to claim 1, wherein said distress message is "HELP!".

7. The remote vehicle disabling and distress indicator system according to claim 1, wherein said distress message is "CALL THE POLICE!".

\* \* \* \* \*